(12) United States Patent
Brackett et al.

(10) Patent No.: US 9,654,629 B1
(45) Date of Patent: May 16, 2017

(54) TELEPHONE USER INTERFACE PROVIDING ENHANCED CALL BLOCKING

(71) Applicant: AT&T INTELLECTUAL PROPERTY I, LP, Atlanta, GA (US)

(72) Inventors: Kim Brackett, Loganville, GA (US); Liaqat Ali, Danville, CA (US); William Morris, IV, Redmond, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 23 days.

(21) Appl. No.: 14/922,465

(22) Filed: Oct. 26, 2015

(51) Int. Cl.
- *H04M 3/42* (2006.01)
- *H04M 3/436* (2006.01)
- *H04M 1/725* (2006.01)
- *H04M 1/663* (2006.01)

(52) U.S. Cl.
CPC .......... *H04M 3/4365* (2013.01); *H04M 1/663* (2013.01); *H04M 1/72519* (2013.01); *H04M 2250/12* (2013.01)

(58) Field of Classification Search
CPC ......... H04M 2250/12; H04M 1/72519; H04M 1/72569; H04M 1/6075; H04M 1/72522; H04M 1/663; H04M 2250/22; H04M 3/2281
USPC .................................................. 379/210.02
See application file for complete search history.

(56) References Cited

U.S. PATENT DOCUMENTS

| | | |
|---|---|---|
| 5,473,671 A | 12/1995 | Partridge et al. |
| 5,875,239 A | 2/1999 | Koralewski |
| 5,999,606 A | 12/1999 | Weishut et al. |
| 6,418,211 B1 | 7/2002 | Irvin et al. |
| 6,721,738 B2* | 4/2004 | Verplaetse ............ G06F 21/32 340/571 |

(Continued)

FOREIGN PATENT DOCUMENTS

| | | |
|---|---|---|
| EP | 1473947 B1 | 4/2007 |
| WO | 9923845 | 5/1999 |

(Continued)

OTHER PUBLICATIONS

"Call Control—Call Blocker", Mobile App, Google Play, play.google.com, ver.2.0, Aug. 26, 2015.

(Continued)

*Primary Examiner* — Olumide T Ajibade Akonai
(74) *Attorney, Agent, or Firm* — Guntin & Gust, PLC; Jay H. Anderson

(57) ABSTRACT

Aspects of the subject disclosure may include, for example, a method in which a device comprising a processor detects a communication session between a calling device and a called device, and receives a motion signal from the called device; the motion signal is generated at a motion sensor of the called device during or after the communication session. The device analyzes the motion signal to determine whether a portion of the motion signal corresponds to a preselected motion of the called device and whether a subsequent call from the calling device accordingly is to be blocked. Responsive to a determination that the subsequent call is to be blocked, the device also updates a list of blocked caller identifiers associated with the called device to add an identifier associated with the calling device. Other embodiments are disclosed.

20 Claims, 15 Drawing Sheets

(56) References Cited

U.S. PATENT DOCUMENTS

| | | |
|---|---|---|
| 7,552,058 B1 | 6/2009 | Zhang et al. |
| 7,848,505 B2 | 12/2010 | Martin et al. |
| 7,912,192 B2 | 3/2011 | Rosencrantz et al. |
| 8,270,588 B2 | 9/2012 | Schwartz et al. |
| 8,311,204 B2 | 11/2012 | Fotta et al. |
| 8,351,590 B2 | 1/2013 | Guven et al. |
| 8,509,405 B2 | 8/2013 | Velusamy et al. |
| 8,813,134 B2 | 8/2014 | Goodman et al. |
| 8,958,782 B1 | 2/2015 | Kelley et al. |
| 8,983,440 B1 | 3/2015 | Saylor et al. |
| 9,060,059 B2 | 6/2015 | Foster |
| 9,078,113 B1 | 7/2015 | Brown |
| 9,524,383 B2* | 12/2016 | Davis ................... G06F 21/35 |
| 2002/0167488 A1* | 11/2002 | Hinckley ............. G06F 1/1626 345/156 |
| 2004/0114747 A1 | 6/2004 | Trandal et al. |
| 2012/0016641 A1* | 1/2012 | Raffa ................... G06F 1/1694 703/2 |
| 2014/0079204 A1 | 3/2014 | Strope et al. |
| 2014/0128047 A1 | 5/2014 | Edwards et al. |
| 2014/0190704 A1 | 7/2014 | Coghill et al. |
| 2015/0023485 A1 | 1/2015 | Guarriello |
| 2015/0086001 A1 | 3/2015 | Farrand et al. |
| 2015/0288796 A1* | 10/2015 | Choi ..................... G06F 3/017 455/557 |

FOREIGN PATENT DOCUMENTS

| | | |
|---|---|---|
| WO | 2004049677 A2 | 6/2004 |
| WO | 2012001016 A1 | 1/2012 |
| WO | 2015091487 | 6/2015 |

OTHER PUBLICATIONS

"Residential User Guide", Cogeco Home Phone, cogeco.ca, Jun. 24, 2009, p. 14.

"TalkTalk Help: Last Caller Barring", TalkTalk, web.archive.org, May 5, 2014.

"T-Lock Call Blocker—Version 5", HQtelecom, hqtelecom.com, Product Code: CT-CID 803 V5.0, Dec. 28, 2013.

\* cited by examiner

400

600

1100

TELEPHONE USER INTERFACE PROVIDING ENHANCED CALL BLOCKING

FIELD OF THE DISCLOSURE

The subject disclosure relates to a telephone user interface that provides enhanced call blocking to improve customer experience.

BACKGROUND

A portion of calls received by a user of a telephone network are unsolicited (automated calls or "robocalls"). In order to avoid receiving such calls, a user typically must follow a multi-step process to block the caller from directing future calls to the user's equipment.

BRIEF DESCRIPTION OF THE DRAWINGS

Reference will now be made to the accompanying drawings, which are not necessarily drawn to scale, and wherein.

DETAILED DESCRIPTION

Figure 1:
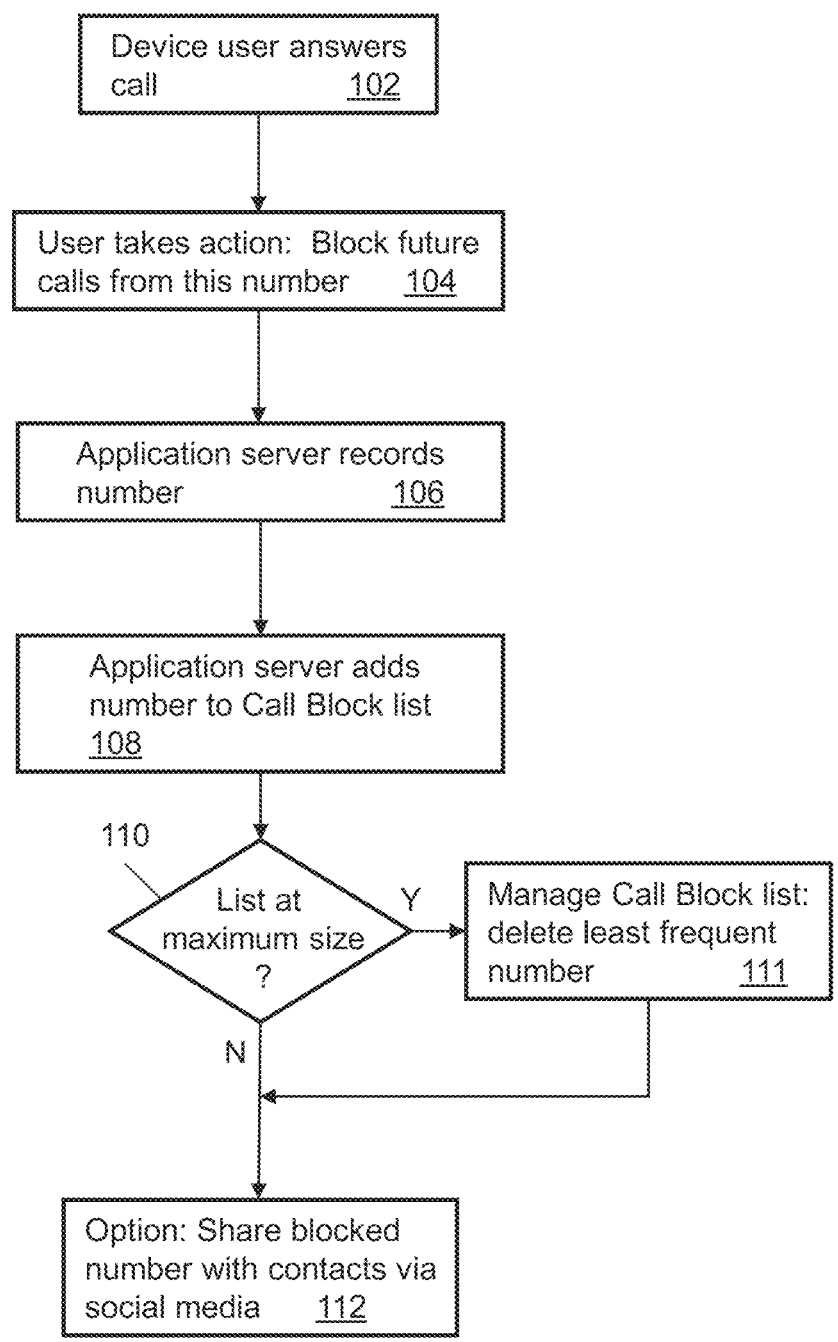
FIG. 1 is a flowchart illustrating a procedure for blocking calls, in accordance with embodiments of the disclosure.

The subject disclosure describes, among other things, illustrative embodiments for blocking unwanted calls (e.g. unsolicited robocalls) on a network that uses a telephony server. Other embodiments are described in the subject disclosure.

One or more aspects of the subject disclosure include a telephony application server (TAS) and a method where a customer receiving an unwanted call can take action to command the TAS to block future calls from the calling number. The TAS adds the telephone number to a "call block" list associated with the customer. If the list reaches a maximum size, the TAS automatically deletes the number calling with least frequency to make room for a new number.

One or more aspects of the subject disclosure include a device comprising a processor and a memory that stores executable instructions. The instructions, when executed by the processor, facilitate performance of operations. The operations comprise detecting a communication session between a calling device and a called device and receiving a motion signal from the called device; the motion signal is generated at a motion sensor of the called device during or after the communication session. The operations also comprise analyzing the motion signal to determine whether a subsequent call from the calling device is to be blocked. The operations further comprise, responsive to a determination that the subsequent call is to be blocked, updating a list of blocked caller identifiers associated with the called device to add an identifier associated with the calling device.

One or more aspects of the subject disclosure include a method comprising receiving, by a device comprising a processor, a motion signal from a called device; the motion signal is generated at a motion sensor of the called device during or after a communication session between the called device and a calling device. The method further comprises analyzing, by the device, the motion signal to determine whether a portion of the motion signal corresponds to a preselected motion of the called device and a subsequent call from the calling device accordingly is to be blocked. The method also comprises, responsive to a determination that the subsequent call is to be blocked, updating a list of blocked caller identifiers associated with the called device to add an identifier associated with the calling device.

One or more aspects of the subject disclosure include a machine-readable storage medium comprising executable instructions which, when executed by a processor, facilitate performance of operations. The operations comprise receiving a motion signal from a called device; the motion signal is generated at a motion sensor of the called device during or after a communication session between the called device and a calling device. The operations also comprise analyzing the motion signal to determine whether a portion of the motion signal corresponds to a preselected motion of the called device and a subsequent call from the calling device accordingly is to be blocked; the preselected motion corresponds to a motion of the called device in a predetermined range of distance, angle, speed, acceleration, oscillation frequency, or a combination thereof. The operations further comprise, responsive to a determination that the subsequent call is to be blocked, updating a list of blocked caller identifiers associated with the called device to add an identifier associated with the calling device.

FIG. 1 is a flowchart illustrating a procedure 100 for blocking calls, in accordance with embodiments of the disclosure. In step 102, a user of a device (e.g. a mobile phone coupled to a telephone application server via a network) answers an incoming call. The user determines that the call is an unwanted call, and takes action (step 104) to prevent future calls from the calling phone number. The user can take any of a variety of actions, as detailed below.

The application server (TAS) records the number (step 106), and adds the number to a "Call Block" list maintained at a database in communication with the TAS (step 108). If the Call Block list has reached a predetermined maximum size (step 110), the TAS can manage the Call Block list (step 111) so that it includes the numbers for the most frequent robocalls; this is done by deleting the least frequent number from the list (that is, the number for the least frequently calling unwanted calling party). In step 112, the user may optionally direct the TAS to share information regarding the blocked number with the user's social media contacts.

Figure 2:
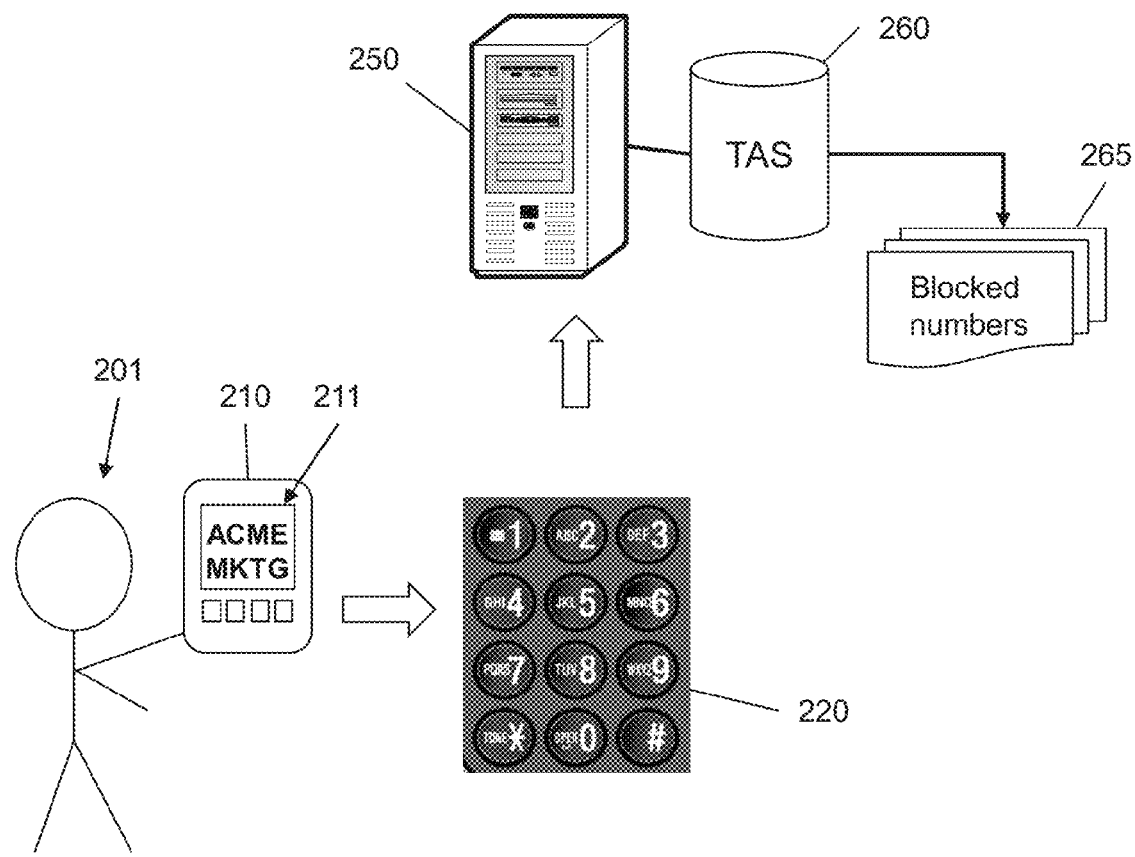
FIG. 2 depicts an illustrative embodiment of enhanced call blocking by a telephone user interface.

FIG. 2 depicts an illustrative embodiment 200 of enhanced call blocking; where a user 201 of a mobile phone 210 enters a telephone user interface (TUI) code on the keypad 220 of the mobile phone. The TUI code (for example, *7) is transmitted to the TAS, shown schematically in FIG. 2 as a server 250 coupled to a storage device with a database 260. The database includes a list 265 of blocked numbers (Call Block list). The TUI code, when transmitted in association with a call to phone 210, directs the TAS to add the number of the calling party to the list 265. (The "calling party" for such calls is often an impersonal entity.) The TAS can then compare the number for a future incoming call to the list of blocked numbers, and block the call from being directed to phone 210 if the number matches any number on the Call Block list.

Figure 3:
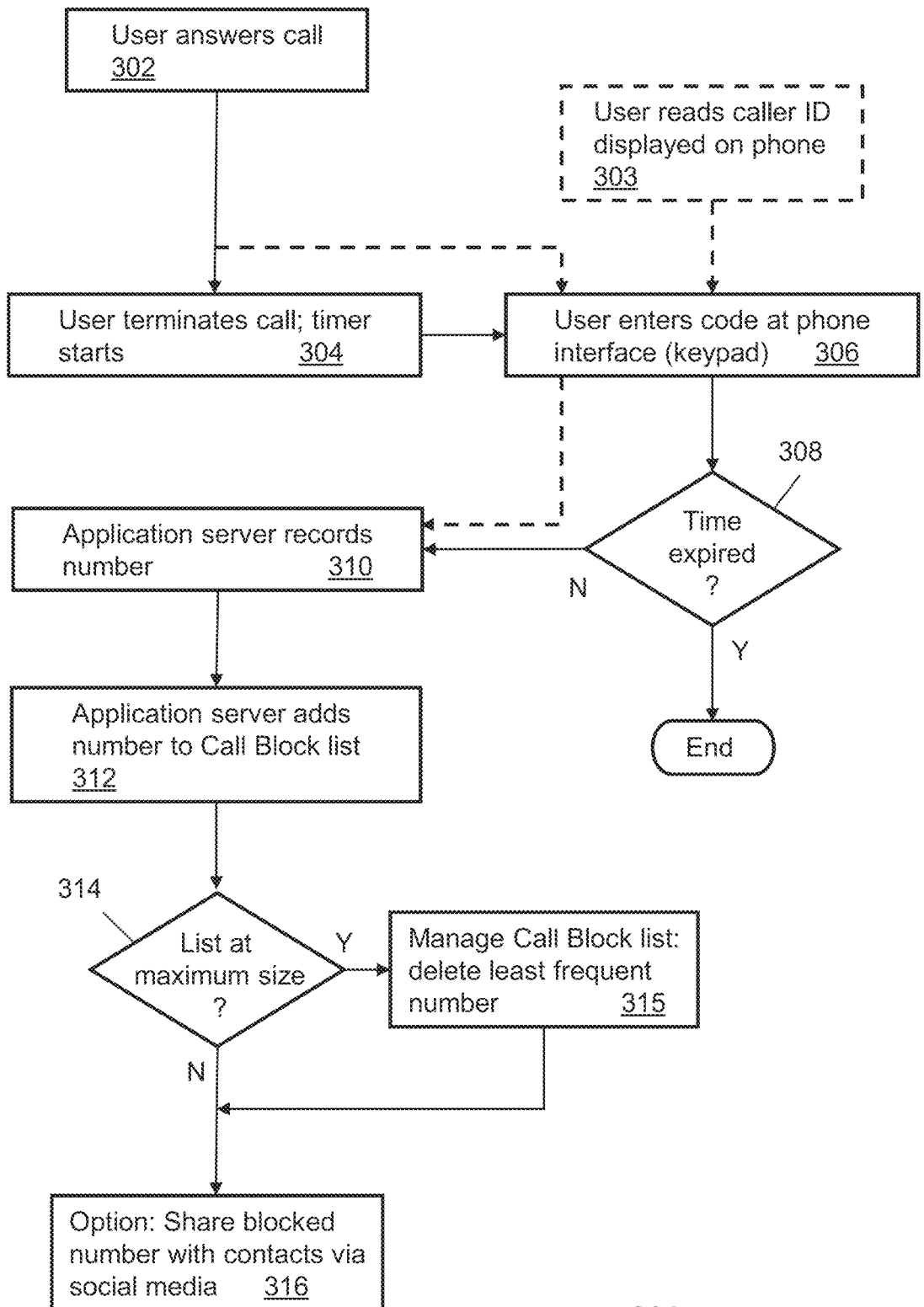
FIG. 3 is a flowchart illustrating a procedure for blocking calls using the telephone user interface of FIG. 2.

FIG. 3 is a flowchart depicting an illustrative embodiment of a method 300 for call blocking using a TUI as shown in FIG. 2. The user answers an incoming call (step 302); the user subsequently terminates the call (step 304) and obtains a new dial tone. The user can then enter the code for call blocking at the phone keypad (step 306) within a predetermined time period after the call is terminated (e.g. 15 seconds). If the TAS receives the code before expiration of the time period (step 308), the TAS records the number associated with the incoming call (step 310) and proceeds to add the number to the Call Block list (step 312).

If the Call Block list has already reached its maximum size (step 314), the TAS employs an algorithm to determine the number calling with the least frequency. This number is deleted from the Call Block list to make room for a new number (step 315).

In an embodiment, the user 201 is presented with an option (step 316) to share the blocked number with the user's social media contacts. If the user selects this option, the TAS can cause messages to be sent to the user's contacts such as, "I have blocked this phone number—you may wish to do the same" along with the blocked number. In an embodiment, this is done via a social media account the user has set up on the network.

In another embodiment, the user can enter the code for call blocking (step 306) via the TUI while the unwanted call is in progress. The code is transmitted to the TAS, which can immediately terminate the call.

In another embodiment, the user can read a caller ID on a display 211 of the phone, and determine that the incoming call is unwanted (step 303). The user then can enter the blocking code (step 306) instead of answering the call. In this embodiment, the TAS receives the blocking code and records the incoming call number (step 310) without connecting the call.

Figure 4:
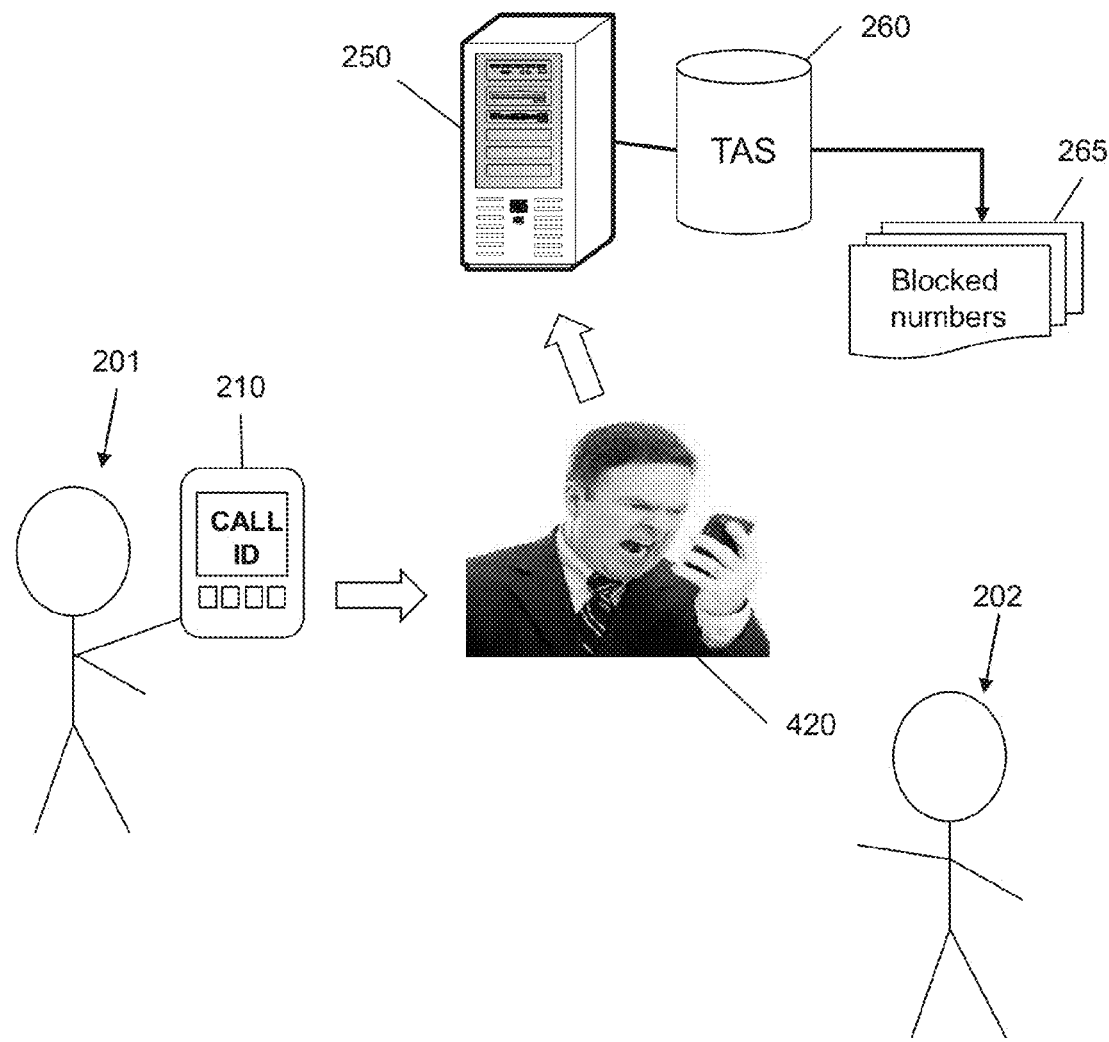
FIG. 4 depicts an illustrative embodiment of enhanced call blocking using a spoken key phrase.

FIG. 4 schematically illustrates call blocking using a spoken key phrase, according to an embodiment 400 of the disclosure. User 201 receives a call on phone 210; after determining that the call is unwanted, the user speaks a phrase 420 during the call. The spoken phrase (key phrase) is processed by a voice recognition application at (or accessed by) the TAS. The key phrase triggers a command to the TAS to add the calling number to the Call Block list.

Figure 5:
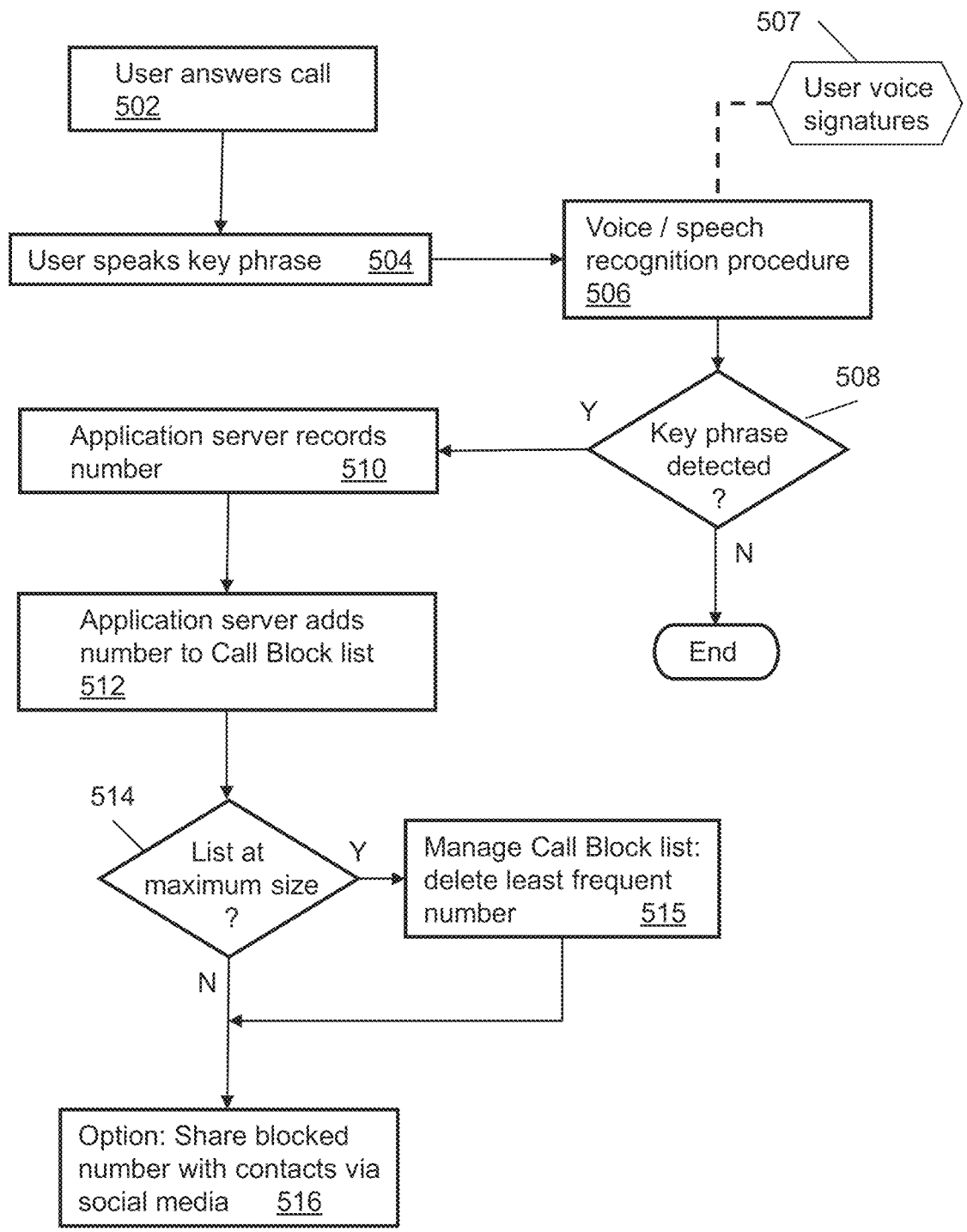
FIG. 5 is a flowchart illustrating a procedure for blocking calls according to the embodiment shown in FIG. 4.

FIG. 5 is a flowchart depicting an illustrative embodiment of a method 500 for call blocking using a spoken key phrase as shown in FIG. 4. The user answers an incoming call (step 502); the user then speaks the key phrase (step 504), such as "Block this call." A voice recognition application processes the user's speech (step 506) to identify the key phrase as a command to the TAS. The voice recognition application can be configured to interpret several different phrases (e.g. both "Unwanted call" and "Block this call") as a key phrase. If the key phrase is detected (step 508), the TAS records the number associated with the incoming call (step 510) and proceeds to add the number to the Call Block list (step 512).

If the Call Block list has already reached its maximum size (step 514), the number calling with the least frequency is deleted from the Call Block list (step 515). The user can also be presented with an option (step 516) to share the blocked number with the user's social media contacts.

In an embodiment, the voice recognition application compares the detected voice signal with a file of users' voice signatures 507 to identify the user who is speaking, and ensure that the user is making a blocking command. For example, one user may have selected and recorded "Block this call" as the key phrase, while another user may have selected and recorded "Unwanted call." The voice recognition application can then determine that a blocking command has been made when (and only when) the user's voice signature matches the phrase previously selected by that user.

In another embodiment, the Call Block list can be personalized to different users of the device, according to their distinct voice signatures. For example, the TAS can maintain a first Call Block list based on a key phrase spoken by user 201, and a second Call Block list based on a key phrase spoken by user 202. The key phrases of the two users may be different, or may be the same provided that the users' voices can be distinguished from each other.

Figure 6:
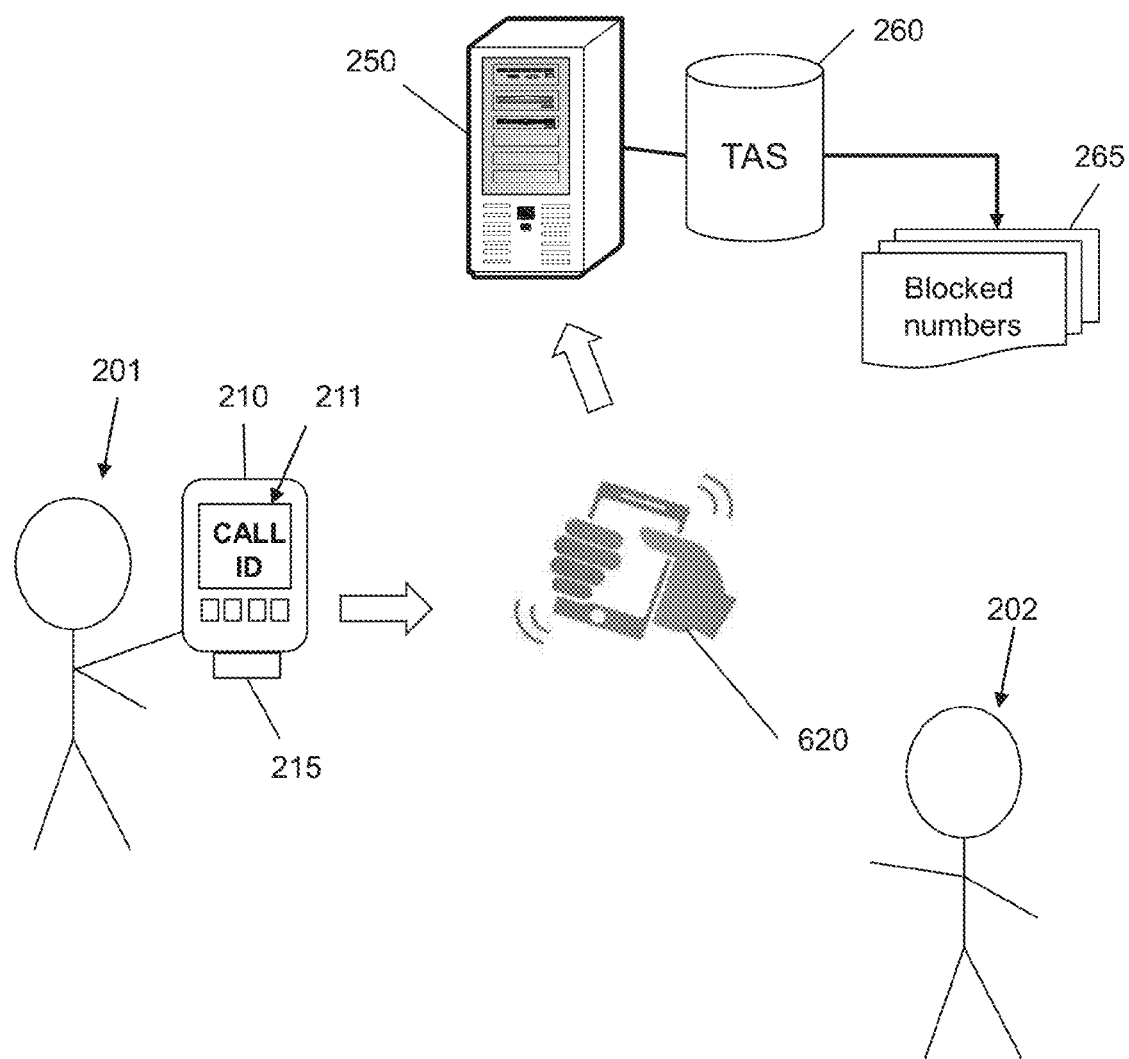
FIG. 6 depicts an illustrative embodiment of enhanced call blocking using physical movement of a mobile phone.

FIG. 6 schematically illustrates call blocking based on physical movement of the phone, according to an embodiment 600 of the disclosure. User 201 receives a call on phone 210, so that the TAS detects a communication session between a calling device and a called device (phone 210). After determining that the call is unwanted, the user performs a shaking motion 620 (key motion) to indicate that the calling number should be blocked. Motion sensors 215 on phone 210 convert the motion of the phone to a motion signal. The motion signal is processed in a motion recognition procedure performed at (or at a device accessed by) the TAS, to determine whether a portion of the motion signal corresponds to the key motion. Detection of the key motion triggers a command to the TAS to add the calling number to the Call Block list.

The motion sensors 215 can include a gyroscope, magnetometer, accelerometer, or a combination thereof. In an embodiment, the motion signal for the key motion corresponds to a motion in a predetermined range of distance, angle, speed, acceleration, oscillation frequency, or a combination thereof. In particular, the key motion can correspond to an oscillation having a frequency range, an amplitude range, and a relative direction of the shaking motion (for example, lateral oscillation at 4-8 Hz over 3-6 cm in the plane of the phone display screen, or torsional oscillation at 2-5 Hz over 30°-60° about the short axis of the phone). In another embodiment, the key motion can correspond to any motion that is repeated a specified number of times in a given time period (for example, four downward strokes within three seconds).

Figure 7:
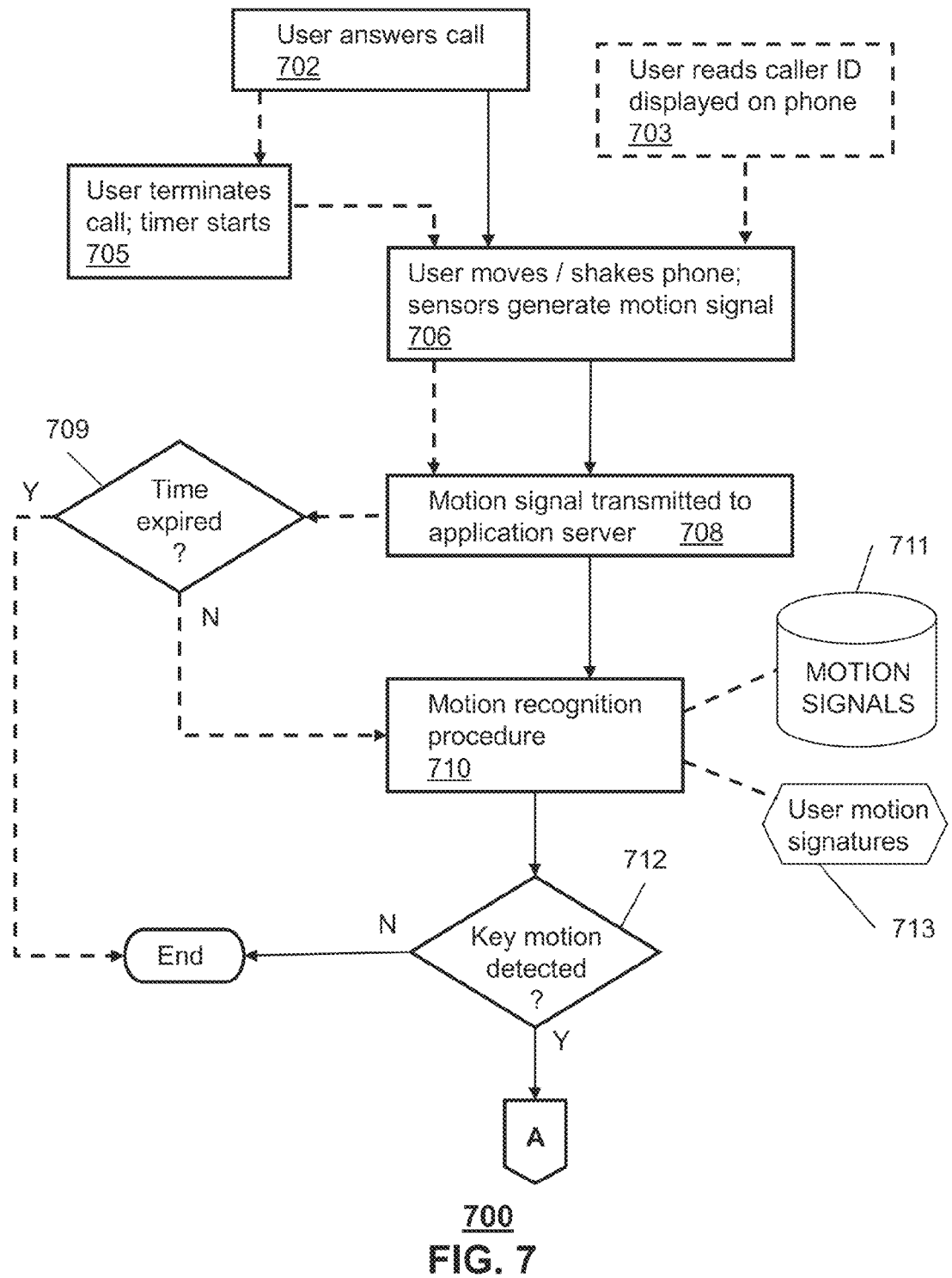
FIGS. 7-8 are connected flowcharts illustrating a procedure for blocking calls according to the embodiment shown in FIG. 6.
Figure 8:
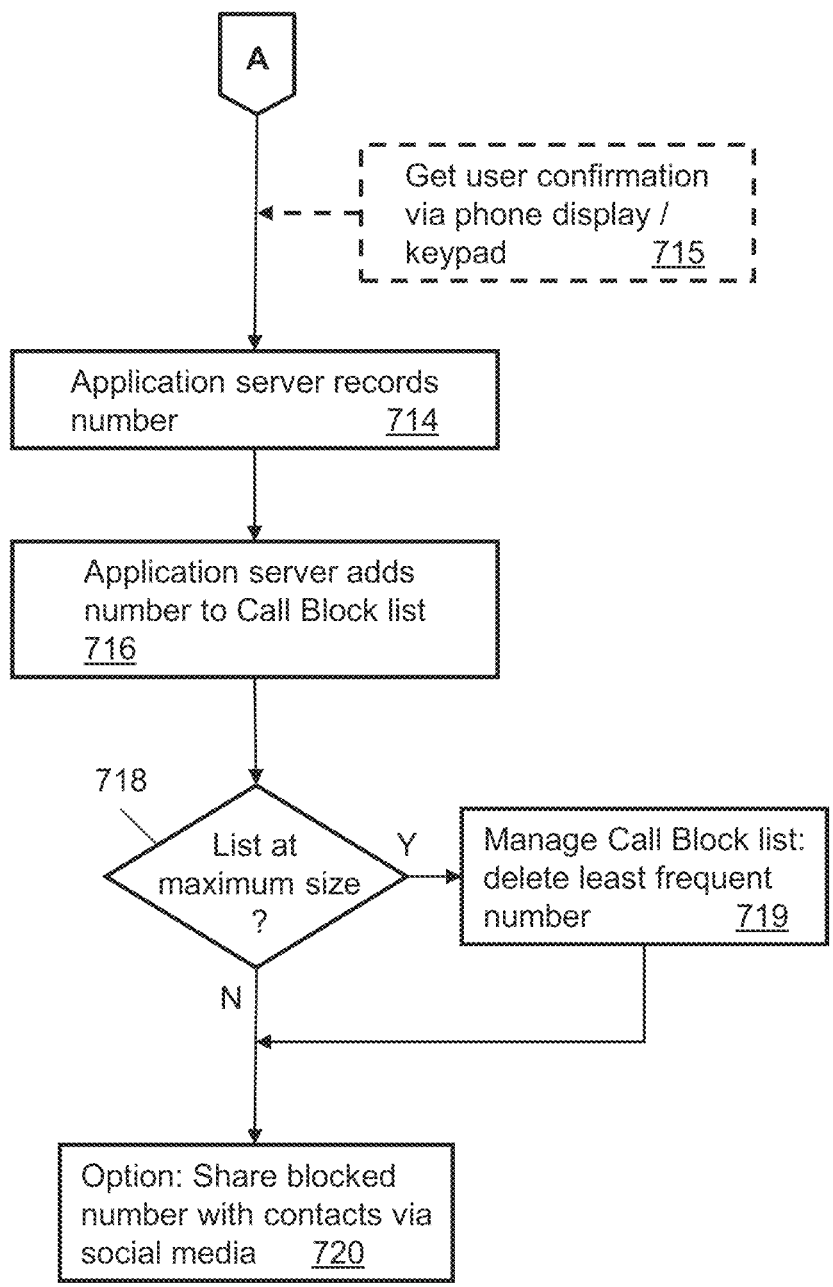

FIGS. 7-8 are connected flowcharts illustrating a procedure 700 for blocking calls according to the embodiment shown in FIG. 6. The user answers an incoming call (step 702); the user determines that the call is unwanted, and shakes the phone (step 706) while the unwanted call is in progress. The motion signal for the phone during the call (in another embodiment, during and after the call) is transmitted to the TAS (step 708). A motion recognition procedure is performed (step 710) to determine whether a portion of the motion signal corresponds to the key motion. If the key motion is detected (step 712), the TAS records the number associated with the incoming call (step 714) and proceeds to add the number to the Call Block list (step 716).

If the Call Block list has already reached its maximum size (step 718), the number calling with the least frequency is deleted from the Call Block list (step 719). The user can also be presented with an option (step 720) to share the blocked number with the user's social media contacts.

In an embodiment, the user terminates the call (step 705) and subsequently performs the shaking motion (step 706) within a predetermined time period after the call is terminated (e.g. 15 seconds). The motion signal is transmitted to the TAS (step 708). For a motion signal received before expiration of the time period (step 709), the TAS performs the motion recognition procedure to determine if the user has performed the key motion. In an embodiment, motion signals from the phone generated during and after the call (up until expiration of the time period) are stored in a memory device 711 accessible by the TAS; the TAS thus can determine whether the key motion occurred after termination of the call.

In an embodiment, the motion recognition procedure compares the detected motion signal with a file of users' motion signatures 713, corresponding to key motions selected by different users. For example, one user may have selected a torsional oscillation as the key motion, which a second user finds uncomfortable to execute; the second user may instead select a shaking motion in the plane of the phone display screen. The motion recognition procedure can then determine that a blocking command has been made if either motion is detected.

In another embodiment, the Call Block list can be personalized to different users of the device, according to their distinct motion signatures. For example, the TAS can maintain a first Call Block list based on a torsional oscillation executed by user 201, and a second Call Block list based on a planar oscillation executed by user 202.

In another embodiment, the TAS can cause a message to be displayed at the phone display 211 (step 715), requesting user confirmation of a blocked call (for example, "OK to block this caller? Press # for YES"). This message can be displayed in situations where the motion signal does not clearly indicate whether a blocking command was intended.

Figure 9:
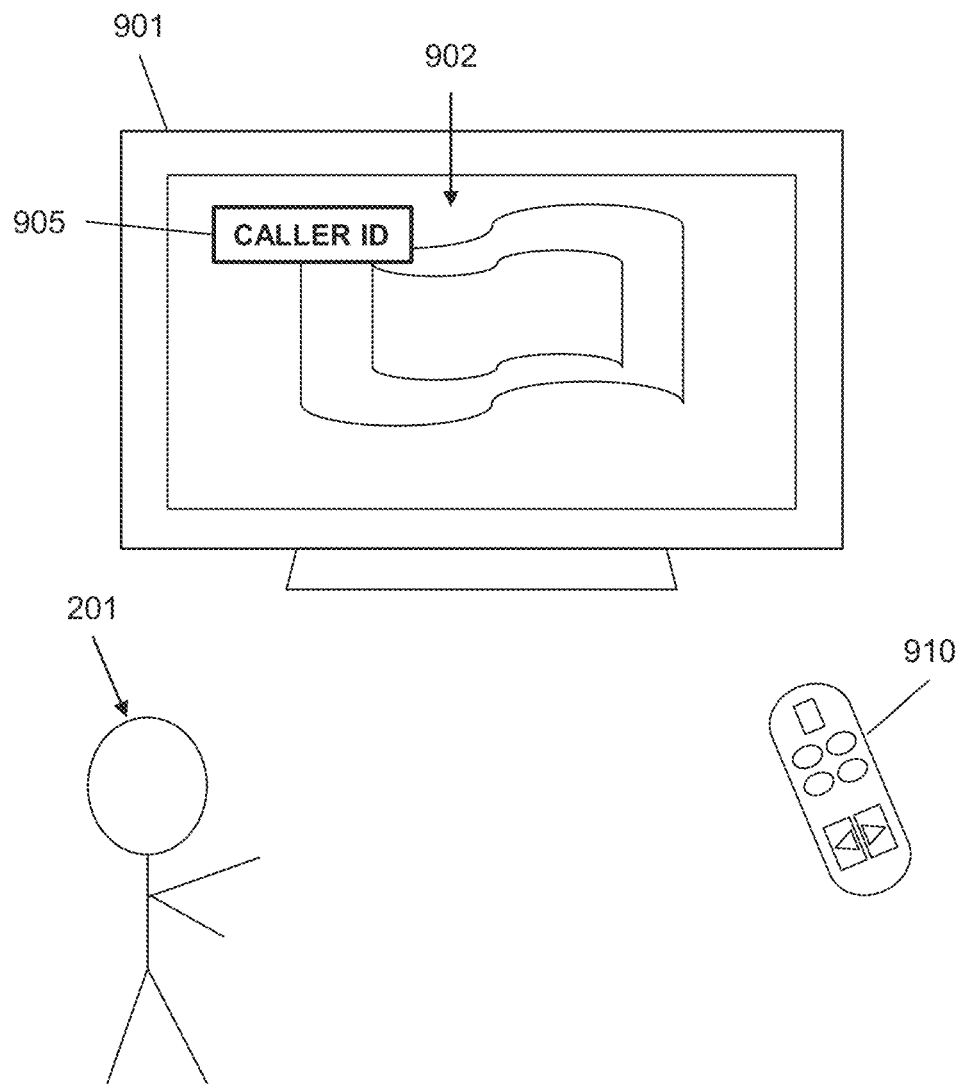
FIGS. 9-10 depict an illustrative embodiment of enhanced call blocking using a television remote control device.
Figure 10:
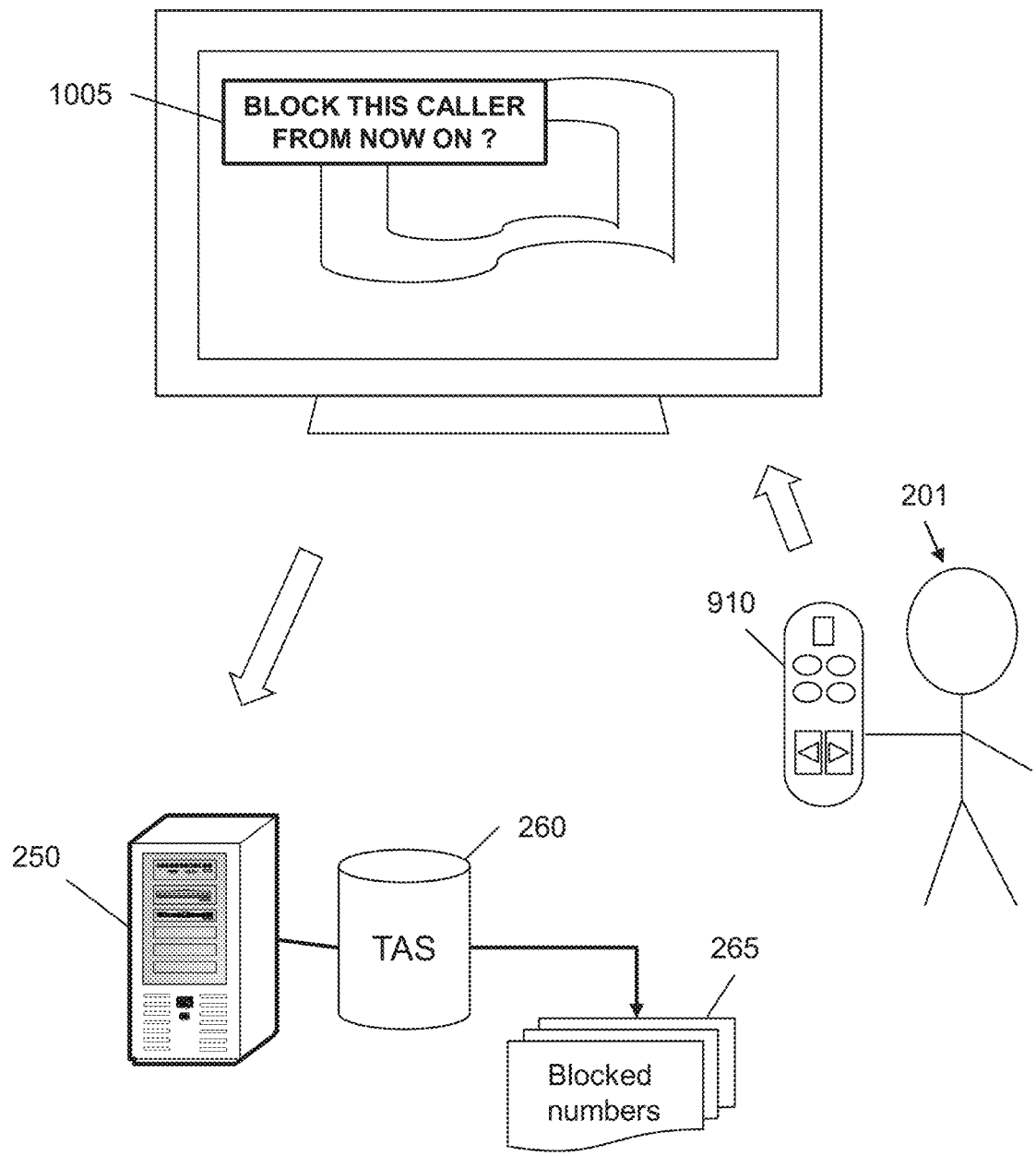

FIGS. 9 and 10 depict illustrative embodiments 900, 1000 of enhanced call blocking using a television remote control device. As shown in FIG. 9, a caller ID 905 for an incoming call is displayed on screen of television 901, overlaying the content 902 being presented on the screen. The user 201 may answer and then terminate the call with remote control device 910. After the user answers the call, an option 1005 is displayed on the television screen for blocking future calls (e.g. "Block this caller from now on?"). The customer can then press the "OK" button on the television remote control to command the TAS to add the calling number to the Call Block list.

Figure 11:
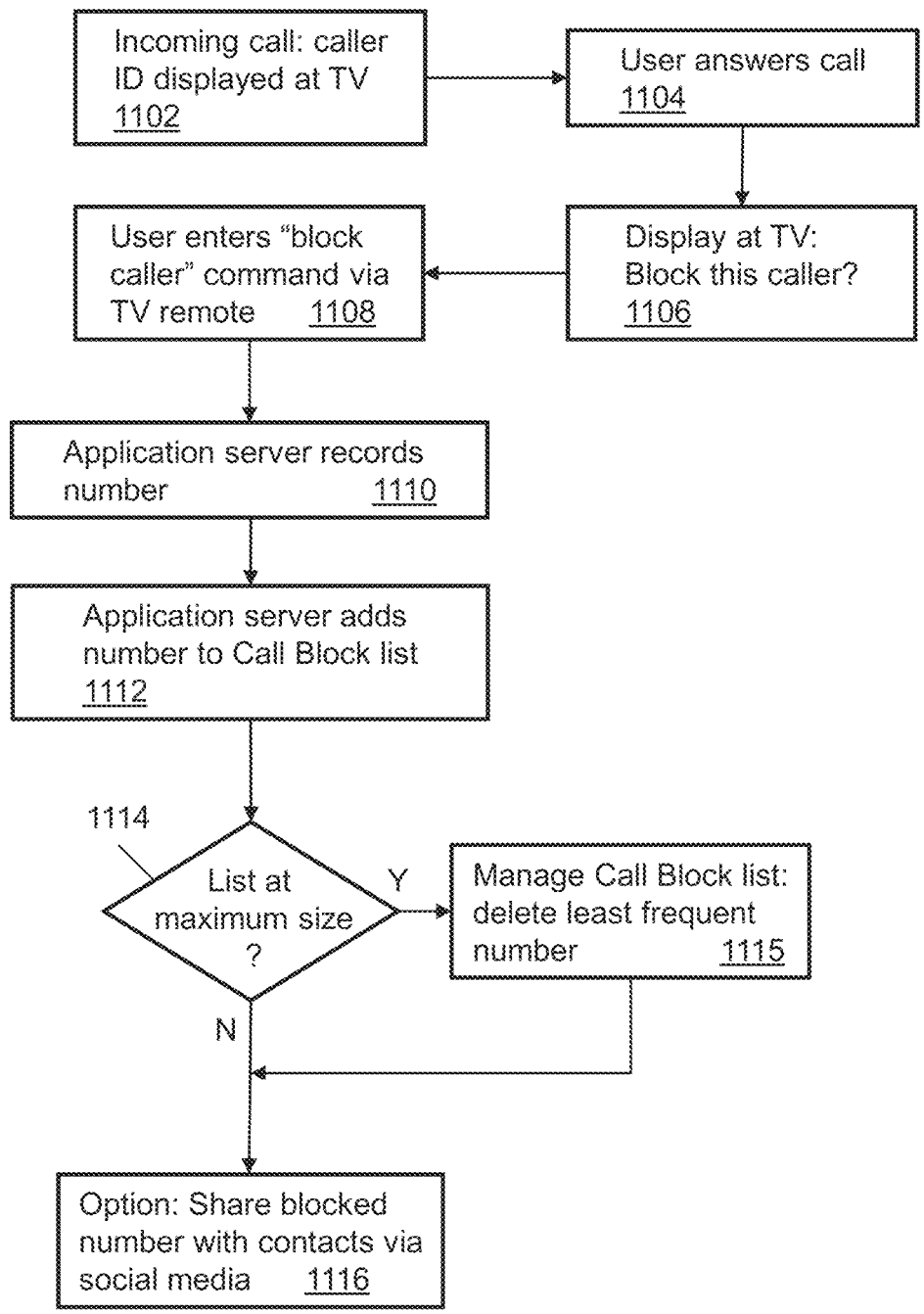
FIG. 11 is a flowchart illustrating a procedure for blocking calls according to the embodiment shown in FIGS. 9-10.

FIG. 11 is a flowchart depicting an illustrative embodiment of a method 1100 for call blocking using a television remote control as shown in FIGS. 9-10. The caller ID for an incoming call is displayed at the television (step 1102); the user answers the call (step 1104). An additional message is then displayed at the television (step 1106), asking whether the user wishes to block the caller. In an embodiment, this message is displayed when the call is answered; the user thus can enter a "block caller" command during the call, using the television remote control 910 (step 1108). The "block caller" command is transmitted to the TAS, which records the number for the incoming call. The TAS can terminate the call immediately upon receiving the command from the remote control device 910. In another embodiment, the message "Block caller from now on?" is displayed after the user terminates the call, and for a predetermined time afterward (e.g. 15 seconds). The user can then enter a "block caller" command while the message is displayed. The TAS proceeds to add the number associated with the incoming call to the Call Block list (step 1112).

If the Call Block list has already reached its maximum size (step 1114), the number calling with the least frequency is deleted from the Call Block list (step 1115). The user can also be presented with an option (step 1116) to share the blocked number with the user's social media contacts. In an embodiment, this option can be presented as another display on the television screen, and the user can respond with the remote control device.

While for purposes of simplicity of explanation, the respective processes are shown and described as a series of blocks in FIGS. 1, 3, 5, 7, 8, 9 and 11, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 12:
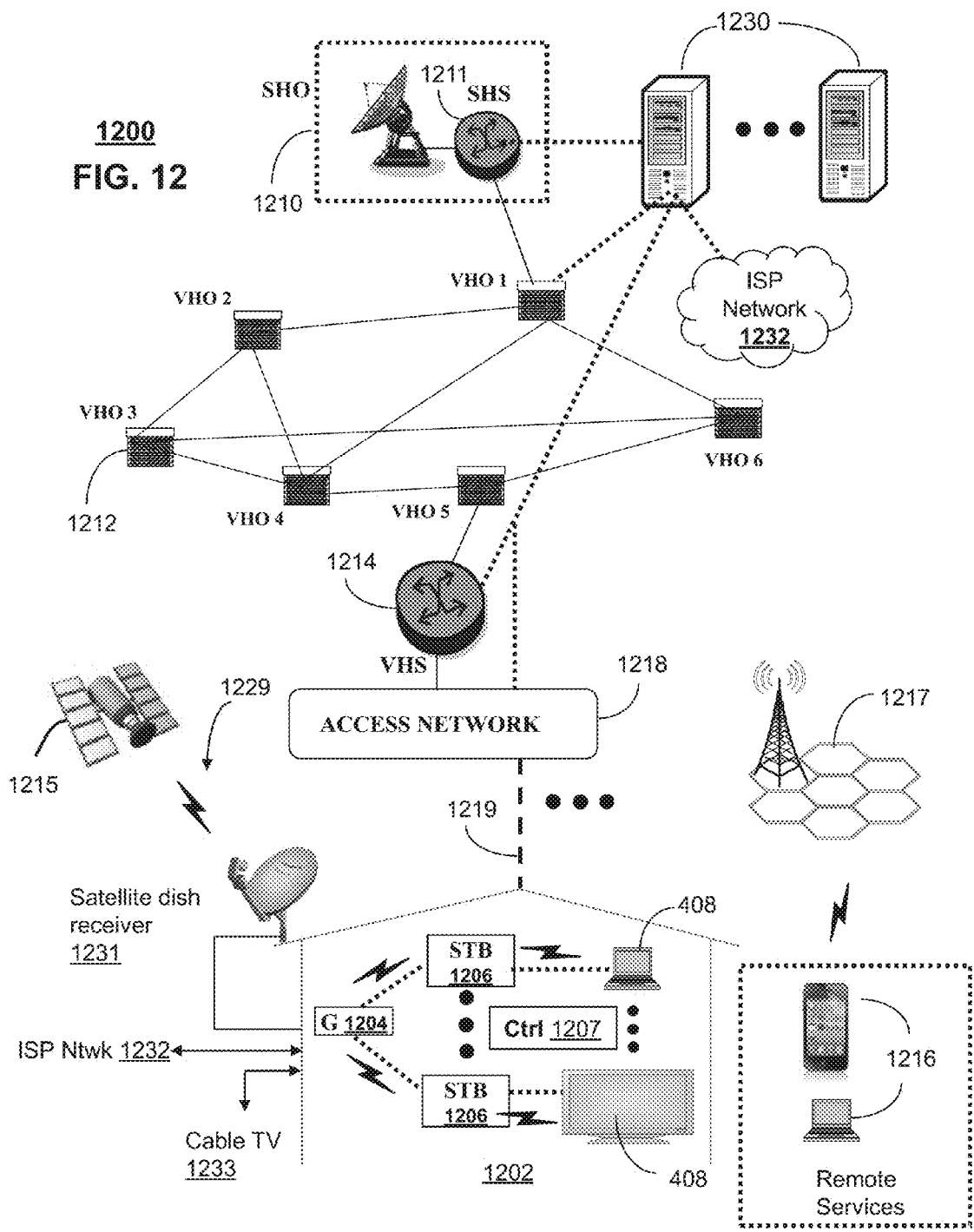
FIGS. 12-13 depict illustrative embodiments of communication systems that provide media services to subscribers, including telephony services.

FIG. 12 depicts an illustrative embodiment of a first communication system 1200 for delivering media content. The communication system 1200 can represent an Internet Protocol Television (IPTV) media system. Communication system 1200 can be overlaid or operably coupled with a telephony system including the telephony application server of FIGS. 2, 4, 6 and 10 as another representative embodiment of communication system 1200. For instance, one or more devices illustrated in the communication system 1200 of FIG. 12 can function as a device comprising a processor and a memory that stores executable instructions that, when executed by the processor, facilitate performance of operations comprising detecting a communication session between a calling device and a called device, and receiving a motion signal from the called device; the motion signal is generated at a motion sensor of the called device during or after the communication session. In particular, the device can analyze the motion signal to determine whether a subsequent call from the calling device is to be blocked. The device also can perform, responsive to a determination that the subsequent call is to be blocked, updating of a list of blocked caller identifiers associated with the called device to add an identifier associated with the calling device.

The IPTV media system can include a super head-end office (SHO) 1210 with at least one super headend office server (SHS) 1211 which receives media content from satellite and/or terrestrial communication systems. In the present context, media content can represent, for example, audio content, moving image content such as 2D or 3D videos, video games, virtual reality content, still image content, and combinations thereof. The SHS server 1211 can forward packets associated with the media content to one or more video head-end servers (VHS) 1214 via a network of video head-end offices (VHO) 1212 according to a multicast communication protocol.

The VHS 1214 can distribute multimedia broadcast content via an access network 1218 to commercial and/or residential buildings 1202 housing a gateway 1204 (such as a residential or commercial gateway). The access network 1218 can represent a group of digital subscriber line access multiplexers (DSLAMs) located in a central office or a service area interface that provide broadband services over fiber optical links or copper twisted pairs 1219 to buildings 1202. The gateway 1204 can use communication technology to distribute broadcast signals to media processors 1206 such as Set-Top Boxes (STBs) which in turn present broadcast channels to media devices 1208 such as computers or television sets managed in some instances by a media controller 1207 (such as an infrared or RF remote controller).

The gateway 1204, the media processors 1206, and media devices 1208 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 1206 and subsystems of the IPTV media system for services such as video-on-demand (VoD), browsing an electronic programming guide (EPG), or other infrastructure services.

A satellite broadcast television system 1229 can be used in the media system of FIG. 12. The satellite broadcast television system can be overlaid, operably coupled with, or replace the IPTV system as another representative embodiment of communication system 1200. In this embodiment, signals transmitted by a satellite 1215 that include media content can be received by a satellite dish receiver 1231 coupled to the building 1202. Modulated signals received by the satellite dish receiver 1231 can be transferred to the media processors 1206 for demodulating, decoding, encoding, and/or distributing broadcast channels to the media devices 1208. The media processors 1206 can be equipped with a broadband port to an Internet Service Provider (ISP) network 1232 to enable interactive services such as VoD and EPG as described above.

In yet another embodiment, an analog or digital cable broadcast distribution system such as cable TV system 1233 can be overlaid, operably coupled with, or replace the IPTV system and/or the satellite TV system as another representative embodiment of communication system 1200. In this embodiment, the cable TV system 1233 can also provide Internet, telephony, and interactive media services. System 1200 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 1230, a portion of which can operate as a web server for providing web portal services over the ISP network 1232 to wireline media devices 1208 or wireless communication devices 1216.

Communication system 1200 can also provide for all or a portion of the computing devices 1230 to function as an application server (herein referred to as server 1230). The server 1230 can use computing and communication technology to manage a telephony system, which can include among other things, implementing the enhanced call blocking methods described in FIGS. 1, 3, 5, 7, 8 and 11. For instance, call blocking facilitated by server 1230 can be similar to the functions described for TAS 250 in accordance with method 100. The media processors 1206 and wireless communication devices 1216 can be provisioned with software functions to utilize the services of server 1230. For instance, functions of media processors 1206 and wireless communication devices 1216 can be similar to the functions described for communication devices 210 and 910 in accordance with methods 100, 300, 500, 700 and 1100.

Multiple forms of media services can be offered to media devices over landline technologies such as those described above. Additionally, media services can be offered to media devices by way of a wireless access base station 1217 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 13:
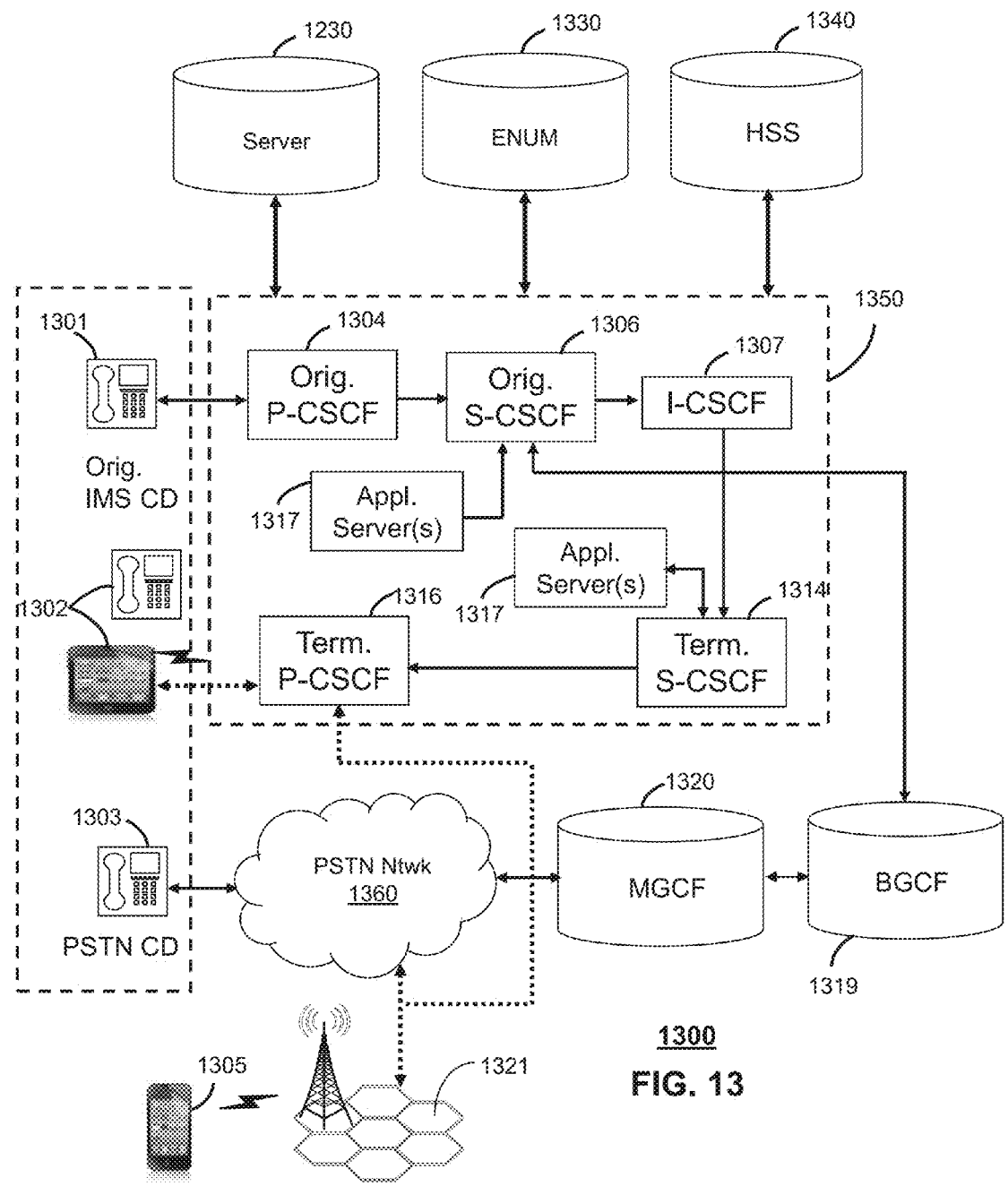

FIG. 13 depicts an illustrative embodiment of a communication system 1300 employing an IP Multimedia Subsystem (IMS) network architecture to facilitate the combined services of circuit-switched and packet-switched systems. Communication system 1300 can be overlaid or operably coupled with a telephony system including the telephony application server of FIGS. 2, 4, 6 and 10 as another representative embodiment of communication system 1200. A device in the system that comprises a processor (e.g. a telephony application server) can perform a method comprising receiving a motion signal from a called device; the motion signal is generated at a motion sensor of the called device during or after a communication session between the called device and a calling device. The method can further comprise analyzing the motion signal to determine whether a portion of the motion signal corresponds to a preselected motion of the called device and whether a subsequent call from the calling device accordingly is to be blocked. The method can further comprise, responsive to a determination that the subsequent call is to be blocked, updating a list of blocked caller identifiers associated with the called device to add an identifier associated with the calling device.

Communication system 1300 can comprise a Home Subscriber Server (HSS) 1340, a tElephone NUmber Mapping (ENUM) server 1330, and other network elements of an IMS network 1350. The IMS network 1350 can establish communications between IMS-compliant communication devices (CDs) 1301, 1302, Public Switched Telephone Network (PSTN) CDs 1303, 1305, and combinations thereof by way of a Media Gateway Control Function (MGCF) 1320 coupled to a PSTN network 1360. The MGCF 1320 need not be used when a communication session involves IMS CD to IMS CD communications. A communication session involving at least one PSTN CD may utilize the MGCF 1320.

IMS CDs 1301, 1302 can register with the IMS network 1350 by contacting a Proxy Call Session Control Function (P-CSCF) which communicates with an interrogating CSCF (I-CSCF), which in turn, communicates with a Serving CSCF (S-CSCF) to register the CDs with the HSS 1340. To initiate a communication session between CDs, an originating IMS CD 1301 can submit a Session Initiation Protocol (SIP INVITE) message to an originating P-CSCF 1304 which communicates with a corresponding originating S-CSCF 1306. The originating S-CSCF 1306 can submit the SIP INVITE message to one or more application servers (ASs) 1317 that can provide a variety of services to IMS subscribers.

For example, the application servers 1317 can be used to perform originating call feature treatment functions on the calling party number received by the originating S-CSCF 1306 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1306 can submit queries to the ENUM system 1330 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1307 to submit a query to the HSS 1340 to identify a terminating S-CSCF 1314 associated with a terminating IMS CD such as reference 1302. Once identified, the I-CSCF 1307 can submit the SIP INVITE message to the terminating S-CSCF 1314. The terminating S-CSCF 1314 can then identify a terminating P-CSCF 1316 associated with the terminating CD 1302. The P-CSCF 1316 may then signal the CD 1302 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 13 may be interchangeable. It is further noted that communication system 1300 can be adapted to support video conferencing. In addition, communication system 1300 can be adapted to provide the IMS CDs 1301, 1302 with the multimedia and Internet services of communication system 1200 of FIG. 12.

If the terminating communication device is instead a PSTN CD such as CD 1303 or CD 1305 (in instances where the cellular phone only supports circuit-switched voice communications), the ENUM system 1330 can respond with an unsuccessful address resolution which can cause the originating S-CSCF 1306 to forward the call to the MGCF 1320 via a Breakout Gateway Control Function (BGCF) 1319. The MGCF 1320 can then initiate the call to the terminating PSTN CD over the PSTN network 1360 to enable the calling and called parties to engage in voice and/or data communications.

It is further appreciated that the CDs of FIG. 13 can operate as wireline or wireless devices. For example, the CDs of FIG. 13 can be communicatively coupled to a cellular base station 1321, a femtocell, a WiFi router, a Digital Enhanced Cordless Telecommunications (DECT) base unit, or another suitable wireless access unit to establish communications with the IMS network 1350 of FIG. 13. The cellular access base station 1321 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 13.

Cellular phones supporting LTE can support packet-switched voice and packet-switched data communications and thus may operate as IMS-compliant mobile devices. In this embodiment, the cellular base station 1321 may communicate directly with the IMS network 1350 as shown by the arrow connecting the cellular base station 1321 and the P-CSCF 1316.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 1230 of FIG. 12 can be operably coupled to communication system 1300 for purposes similar to those described above. Server 1230 can perform speech recognition, motion recognition and Call Block list management functions and thereby provide enhanced call blocking services to the CDs 1301, 1302, 1303 and 1305 of FIG. 13, similar to the functions described for server 250 of FIGS. 2, 4, 6 and 10 in accordance with methods 100, 300, 500, 700 and 1100 of FIGS. 1, 3, 5, 7-8 and 9-10. Server 1230 can be an integral part of the application server(s) 1317 performing enhanced call blocking functions and can be adapted to the operations of the IMS network 1350.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 14:
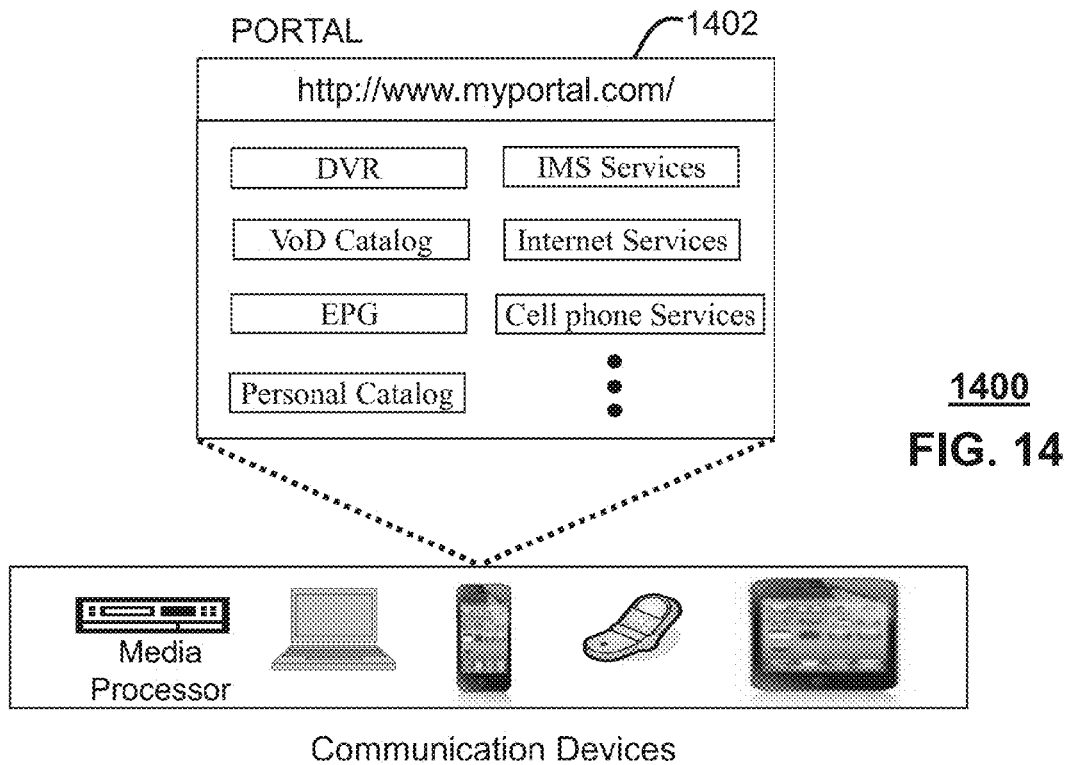
FIG. 14 depicts an illustrative embodiment of a web portal for interacting with the communication systems of FIGS. 12 and 13.

FIG. 14 depicts an illustrative embodiment of a web portal 1402 of a communication system 1400. Communication system 1400 can be overlaid or operably coupled with TAS servers shown in FIGS. 2, 4, 6 and 10, communication system 1200, and/or communication system 1300 as another representative embodiment of communication system 1200, and/or communication system 1300. The web portal 1402 can be used for managing services of systems shown in FIGS. 2, 4, 6 and 10, and communication systems 1200-1300. A web page of the web portal 1402 can be accessed by a Uniform Resource Locator (URL) with an Internet browser using an Internet-capable communication device such as those described in FIGS. 2 and/or 9 and FIGS. 12-13. The web portal 1402 can be configured, for example, to access a media processor 1206 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1206. The web portal 1402 can also be used for provisioning IMS services described earlier, provisioning Internet services, provisioning cellular phone services, and so on.

The web portal 1402 can further be utilized to manage and provision software applications and to adapt these applications as may be desired by subscribers and/or service providers of the telephony system of FIGS. 2, 4, 6, and/or 9-10, and communication systems 1200-1300. For instance, users of the services provided by server 250 or server 1230 can log into their on-line accounts and provision the server 250 or server 1230 with contact information to enable it to communicate with devices described in FIGS. 2, 4, 6, 9 and 10, and so on. Service providers can log onto an administrator account to provision, monitor and/or maintain the system of TAS 250-260 or server 1230.

Figure 15:
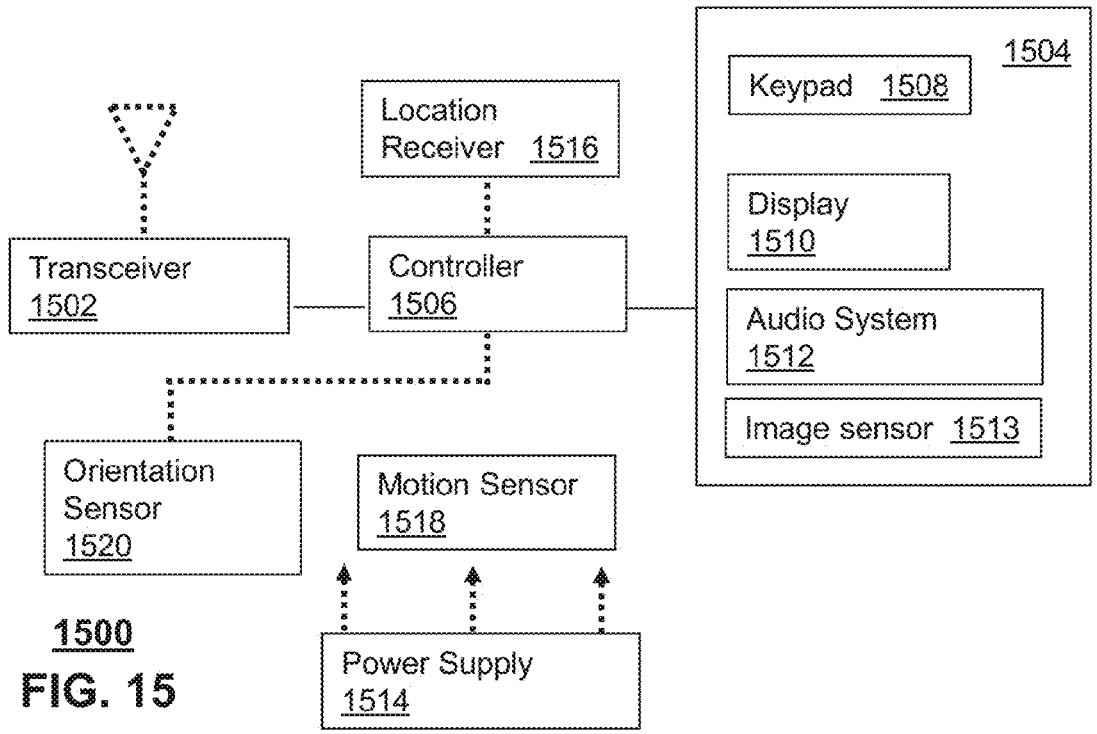
FIG. 15 depicts an illustrative embodiment of a communication device.

FIG. 15 depicts an illustrative embodiment of a communication device 1500. Communication device 1500 can serve in whole or in part as an illustrative embodiment of the devices depicted in FIGS. 2, 4, 6, 9-10 and 12-13, and can be configured to perform portions of [methods 100, 300, 500, 700 and 1100 of FIGS. 1, 3, 5, 7-8 and 11.

Communication device 1500 can comprise a wireline and/or wireless transceiver 1502 (herein transceiver 1502), a user interface (UI) 1504, a power supply 1514, a location receiver 1516, a motion sensor 1518, an orientation sensor 1520, and a controller 1506 for managing operations thereof. The transceiver 1502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 1502 can also be adapted to support circuit-switched wireline access technologies (such as PSTN), packet-switched wireline access technologies (such as TCP/IP, VoIP, etc.), and combinations thereof.

The UI 1504 can include a depressible or touch-sensitive keypad 1508 with a navigation mechanism such as a roller ball, a joystick, a mouse, or a navigation disk for manipulating operations of the communication device 1500. The keypad 1508 can be an integral part of a housing assembly of the communication device 1500 or an independent device operably coupled thereto by a tethered wireline interface (such as a USB cable) or a wireless interface supporting for example Bluetooth®. The keypad 1508 can represent a numeric keypad commonly used by phones, and/or a QWERTY keypad with alphanumeric keys. The UI 1504 can further include a display 1510 such as monochrome or color LCD (Liquid Crystal Display), OLED (Organic Light Emitting Diode) or other suitable display technology for conveying images to an end user of the communication device 1500. In an embodiment where the display 1510 is touch-sensitive, a portion or all of the keypad 1508 can be presented by way of the display 1510 with navigation features.

The display 1510 can use touch screen technology to also serve as a user interface for detecting user input. As a touch screen display, the communication device 1500 can be adapted to present a user interface with graphical user interface (GUI) elements that can be selected by a user with a touch of a finger. The touch screen display 1510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1510 can be an integral part of the housing assembly of the communication device 1500 or an independent device communicatively coupled thereto by a tethered wireline interface (such as a cable) or a wireless interface.

The UI 1504 can also include an audio system 1512 that utilizes audio technology for conveying low volume audio (such as audio heard in proximity of a human ear) and high volume audio (such as speakerphone for hands free operation). The audio system 1512 can further include a microphone for receiving audible signals of an end user. The audio system 1512 can also be used for voice recognition applications. The UI 1504 can further include an image sensor 1513 such as a charged coupled device (CCD) camera for capturing still or moving images.

The power supply 1514 can utilize common power management technologies such as replaceable and rechargeable batteries, supply regulation technologies, and/or charging system technologies for supplying energy to the components of the communication device 1500 to facilitate long-range or short-range portable applications. Alternatively, or in combination, the charging system can utilize external power sources such as DC power supplied over a physical interface such as a USB port or other suitable tethering technologies.

The location receiver 1516 can utilize location technology such as a global positioning system (GPS) receiver capable of assisted GPS for identifying a location of the communication device 1500 based on signals generated by a constellation of GPS satellites, which can be used for facilitating location services such as navigation. The motion sensor 1518 can utilize motion sensing technology such as an accelerometer, a gyroscope, or other suitable motion sensing technology to detect motion of the communication device 1500 in three-dimensional space. The orientation sensor 1520 can utilize orientation sensing technology such as a magnetometer to detect the orientation of the communication device 1500 (north, south, west, and east, as well as combined orientations in degrees, minutes, or other suitable orientation metrics).

The communication device 1500 can use the transceiver 1502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1500.

Other components not shown in FIG. 15 can be used in one or more embodiments of the subject disclosure. For instance, the communication device 1500 can include a reset button (not shown). The reset button can be used to reset the controller 1506 of the communication device 1500. In yet another embodiment, the communication device 1500 can also include a factory default setting button positioned, for example, below a small hole in a housing assembly of the communication device 1500 to force the communication device 1500 to re-establish factory settings. In this embodiment, a user can use a protruding object such as a pen or paper clip tip to reach into the hole and depress the default setting button. The communication device 1500 can also include a slot for adding or removing an identity module such as a Subscriber Identity Module (SIM) card. SIM cards can be used for identifying subscriber services, executing programs, storing subscriber data, and so forth.

The communication device 1500 as described herein can operate with more or less of the circuit components shown in FIG. 15. These variant embodiments can be used in one or more embodiments of the subject disclosure.

The communication device 1500 can be adapted to perform the functions of the media processor 1206, the media devices 1208, or the portable communication devices 1216 of FIG. 12, as well as the IMS CDs 1301-1302 and PSTN CDs 1303-1305 of FIG. 13. It will be appreciated that the communication device 1500 can also represent other devices that can operate in communication systems 1200-1300 of FIGS. 12-13 such as a gaming console and a media player. In addition, the controller 1506 can be adapted in various embodiments to perform the enhanced call blocking functions described above.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 16:
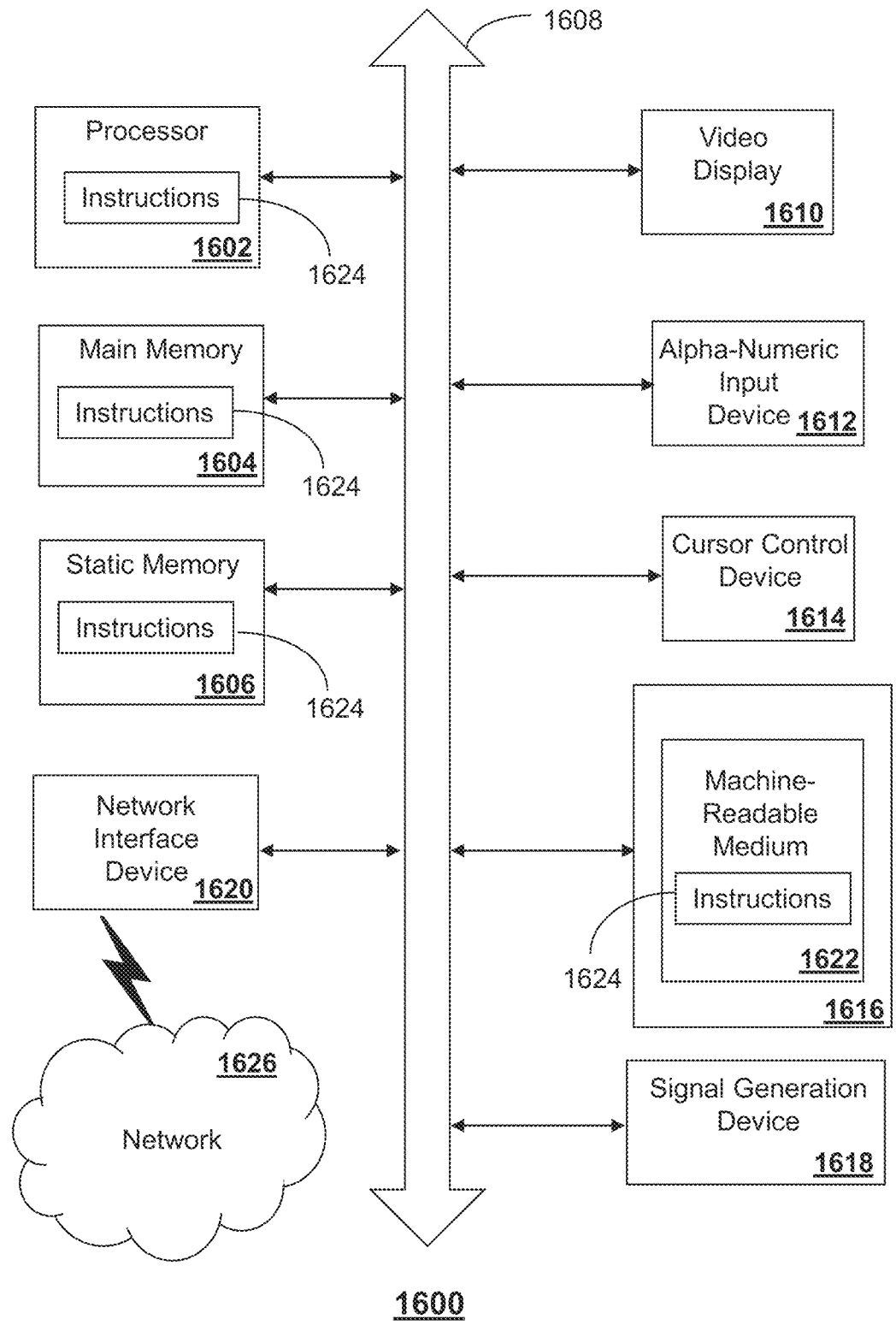
FIG. 16 is a diagrammatic representation of a machine in the form of a computer system within which a set of instructions, when executed, may cause the machine to perform any one or more of the methods described herein.

FIG. 16 depicts an exemplary diagrammatic representation of a machine in the form of a computer system 1600 within which a set of instructions, when executed, may cause the machine to perform any one or more of the methods described above. One or more instances of the machine can operate, for example, as the server 1230, the telephony application server 250, and other devices of FIGS. 2, 4, 6, 9 and 10. In some embodiments, the machine may be connected (e.g., using a network 1626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1600 may include a processor (or controller) 1602 (e.g., a central processing unit (CPU)), a graphics processing unit (GPU, or both), a main memory 1604 and a static memory 1606, which communicate with each other via a bus 1608. The computer system 1600 may further include a display unit 1610 (e.g., a liquid crystal display (LCD), a flat panel, or a solid state display). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620. In distributed environments, the embodiments described in the subject disclosure can be adapted to utilize multiple display units 1610 controlled by two or more computer systems 1600. In this configuration, presentations described by the subject disclosure may in part be shown in a first of the display units 1610, while the remaining portion is presented in a second of the display units 1610.

The disk drive unit 1616 may include a tangible computer-readable storage medium 1622 on which is stored one or more sets of instructions (e.g., software 1624) embodying any one or more of the methods or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A device comprising:
a processor; and
a memory that stores executable instructions that, when executed by the processor, facilitate performance of operations, comprising:
detecting a communication session between a calling device and a called device;

receiving a motion signal from the called device, wherein the motion signal is generated at a motion sensor of the called device during the communication session or after termination of the communication session;

analyzing the motion signal to determine whether a subsequent call from the calling device is to be blocked; and responsive to a determination that the subsequent call is to be blocked, updating a list of blocked caller identifiers associated with the called device to add an identifier associated with the calling device.

2. The device of claim 1, wherein the analyzing comprises determining that the subsequent call is to be blocked in accordance with determining that a portion of the motion signal corresponds to a preselected motion of the called device.

3. The device of claim 2, wherein the preselected motion corresponds to a motion of the called device caused by a user, the motion being in a predetermined range of distance, angle, speed, acceleration, oscillation frequency, or a combination thereof.

4. The device of claim 2, wherein the called device is associated with a plurality of users, and wherein a different preselected motion is associated with each of the plurality of users.

5. The device of claim 4, wherein a different list of blocked caller identifiers is associated with each of the plurality of users.

6. The device of claim 1, wherein the motion signal is received during the communication session, and wherein the operations further comprise terminating the communication session responsive to determining that the subsequent call is to be blocked.

7. The device of claim 1, wherein the motion signal is received during the communication session and after termination of the communication session.

8. The device of claim 7, wherein the motion signal is received within a predetermined time period after the termination of the communication session.

9. The device of claim 1, wherein the motion sensor comprises a gyroscope, a magnetometer, an accelerometer, or a combination thereof.

10. The device of claim 1, wherein the list of blocked caller identifiers has a predetermined size, and wherein the operations further comprise:

responsive to determining that the list is to exceed the size due to the added identifier:

determining an identifier of a calling device calling with a least frequency; and deleting that identifier from the list.

11. The device of claim 1, wherein the operations further comprise facilitating a message from equipment of a user to a contact via social media, the message including the identifier associated with the calling device.

12. A method comprising:

receiving, by a device comprising a processor, a motion signal from a called device, wherein the motion signal is generated at a motion sensor of the called device during a communication session between the called device and a calling device or after termination of the communication session;

analyzing, by the device, the motion signal to determine whether a portion of the motion signal corresponds to a preselected motion of the called device and a subsequent call from the calling device accordingly is to be blocked; and responsive to a determination that the subsequent call is to be blocked, updating, by the device, a list of blocked caller identifiers associated with the called device to add an identifier associated with the calling device.

13. The method of claim 12, wherein the called device is associated with a plurality of users, and wherein a different preselected motion is associated with each of the plurality of users.

14. The method of claim 12, wherein the motion signal is received during the communication session, and further comprising terminating the communication session responsive to determining that the subsequent call is to be blocked.

15. The method of claim 12, wherein the motion signal is received during the communication session and after termination of the communication session.

16. The method of claim 15, wherein the motion signal is received within a predetermined time period after the termination of the communication session.

17. A machine-readable storage medium comprising executable instructions which, when executed by a processor, facilitate performance of operations comprising:

receiving a motion signal from a called device, wherein the motion signal is generated at a motion sensor of the called device during a communication session between the called device and a calling device or after termination of the communication session;

analyzing the motion signal to determine whether a portion of the motion signal corresponds to a preselected motion of the called device and a subsequent call from the calling device accordingly is to be blocked, wherein the preselected motion corresponds to a motion of the called device in a predetermined range of distance, angle, speed, acceleration, oscillation frequency, or a combination thereof; and responsive to a determination that the subsequent call is to be blocked, updating a list of blocked caller identifiers associated with the called device to add an identifier associated with the calling device.

18. The machine-readable storage medium of claim 17, wherein the motion signal is received during the communication session, and wherein the operations further comprise terminating the communication session responsive to determining that the subsequent call is to be blocked.

19. The machine-readable storage medium of claim 17, wherein the motion signal is received after termination of the communication session.

20. The machine-readable storage medium of claim 19, wherein the analyzing is performed responsive to the motion signal being received within a predetermined time period after the termination of the communication session.

* * * * *